May 18, 1965    A. CZARNECKI    3,184,039
HEAVY DUTY VERTICAL CONVEYOR
Filed Aug. 13, 1962    7 Sheets-Sheet 2
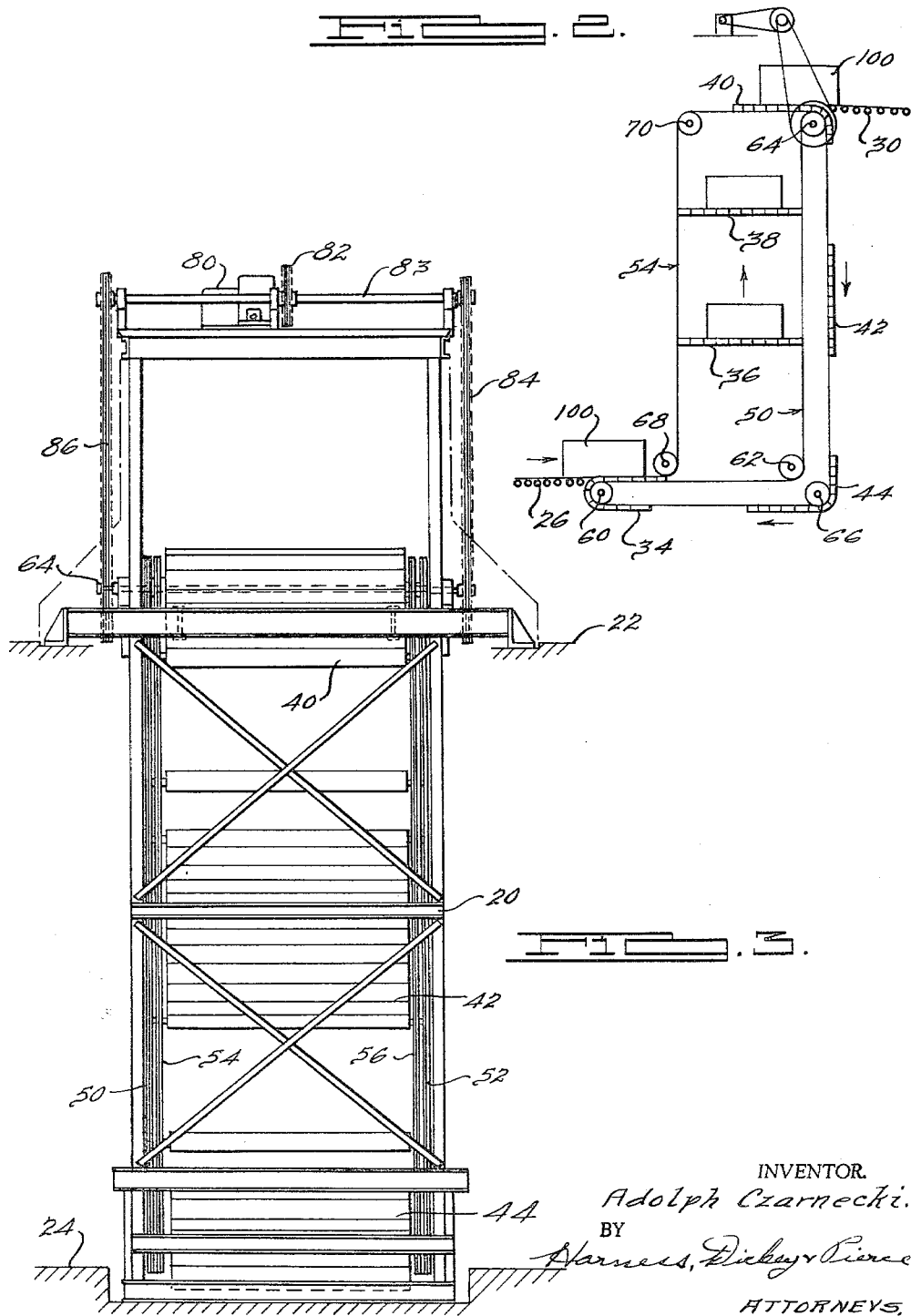
INVENTOR.
Adolph Czarnecki.
BY
Harness, Dickey & Pierce
ATTORNEYS.

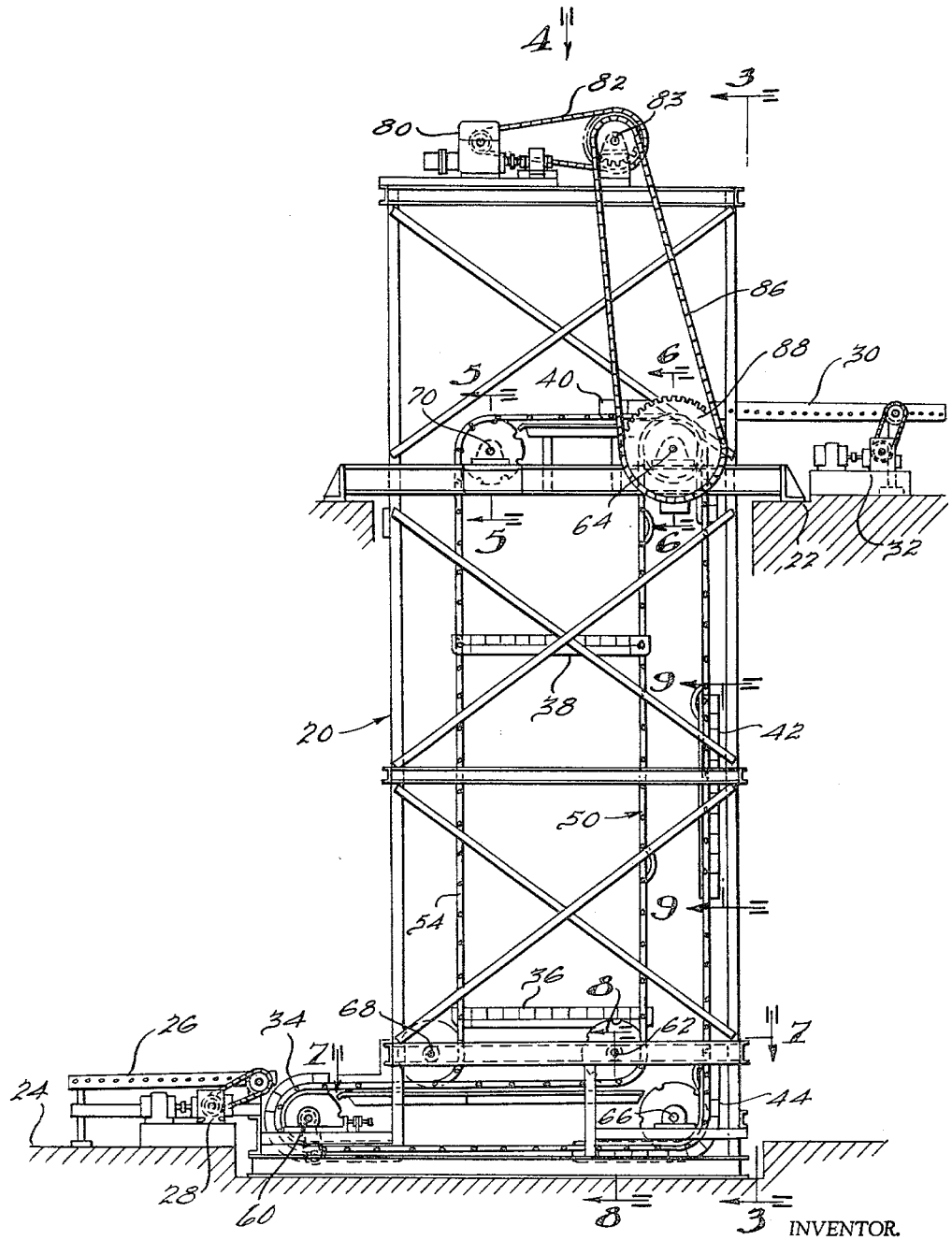

May 18, 1965  A. CZARNECKI  3,184,039
HEAVY DUTY VERTICAL CONVEYOR
Filed Aug. 13, 1962  7 Sheets-Sheet 3
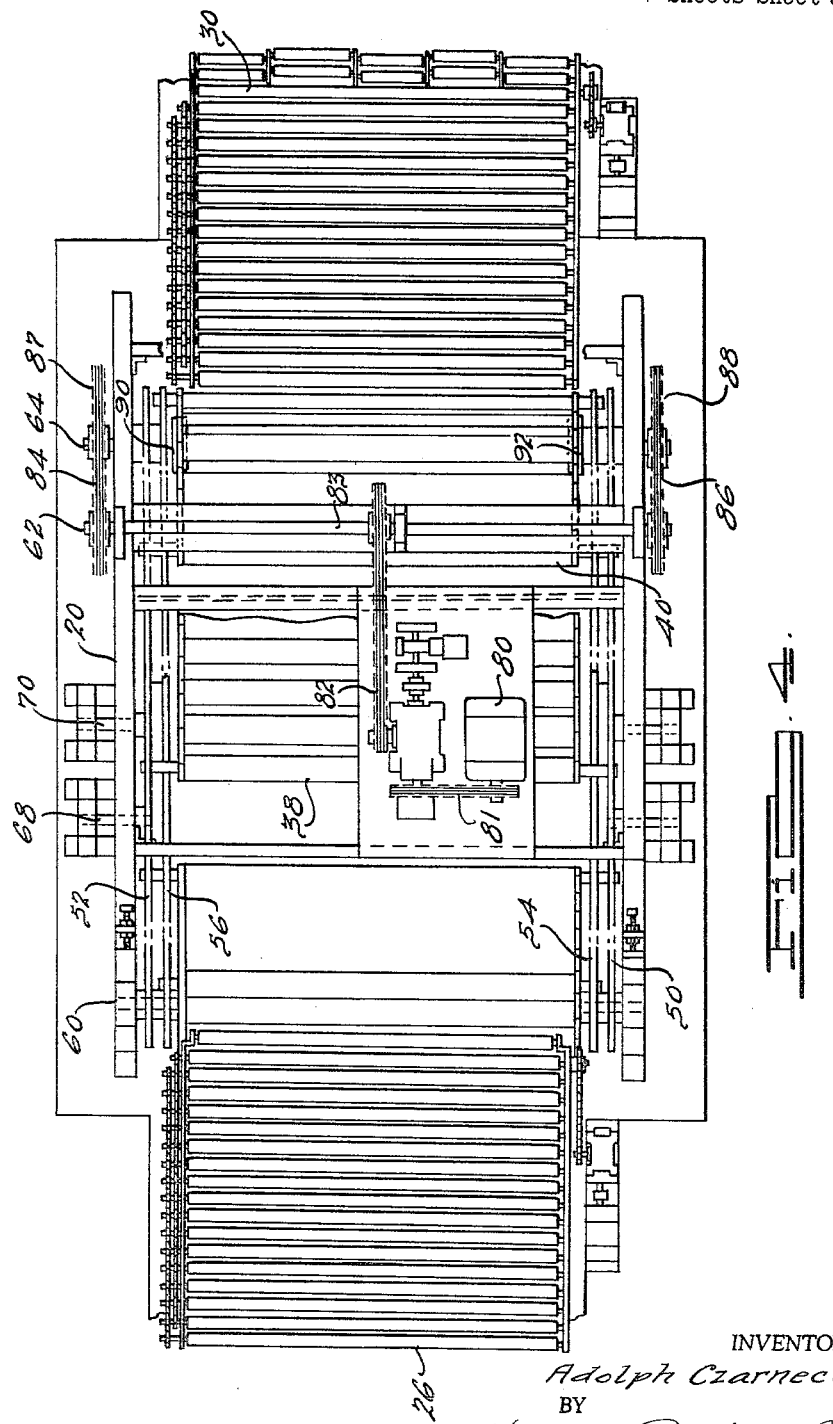
INVENTOR.
Adolph Czarnecki.
BY
Harness, Dickey & Pierce
ATTORNEYS.

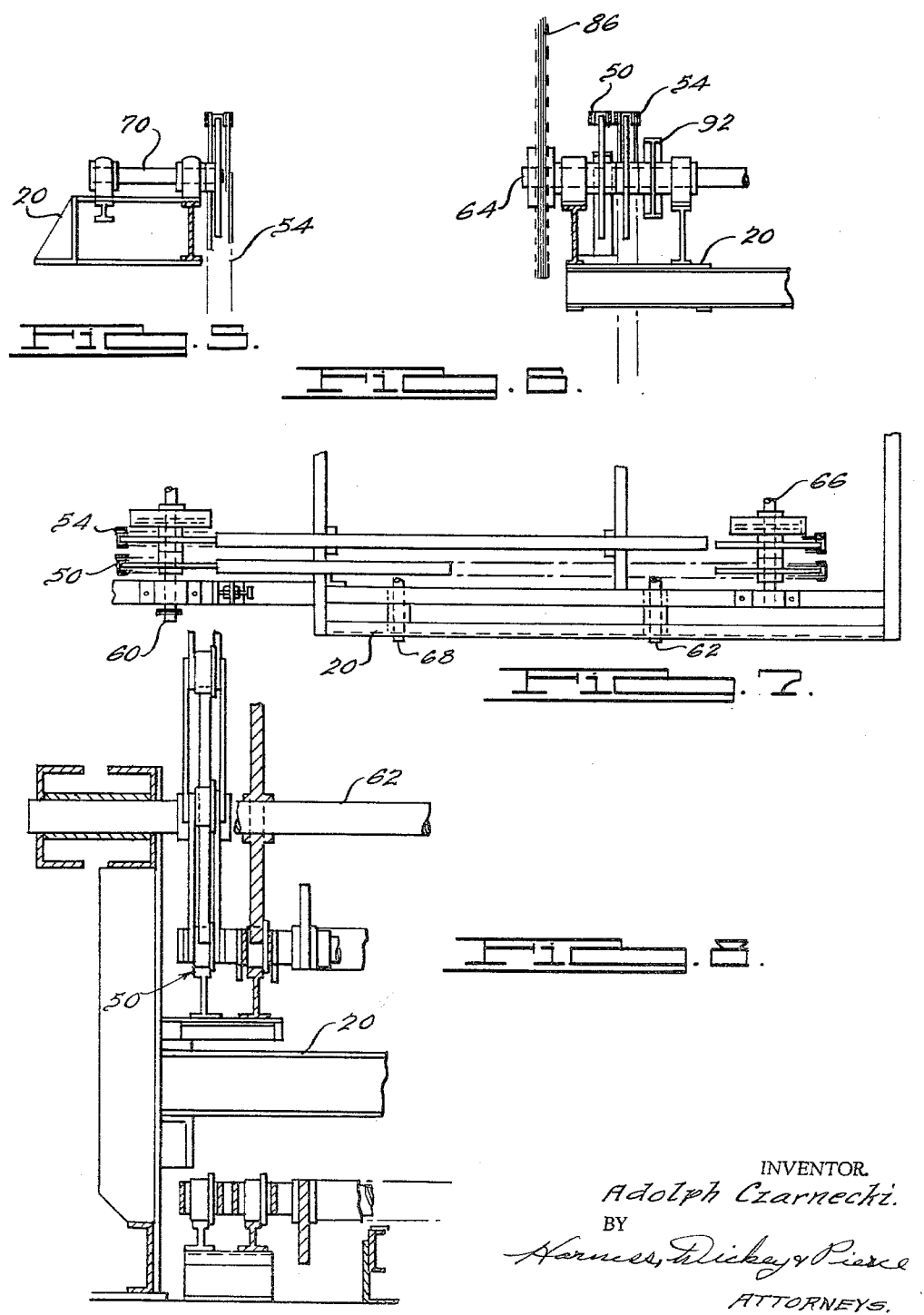

May 18, 1965
A. CZARNECKI
3,184,039
HEAVY DUTY VERTICAL CONVEYOR
Filed Aug. 13, 1962
7 Sheets-Sheet 5
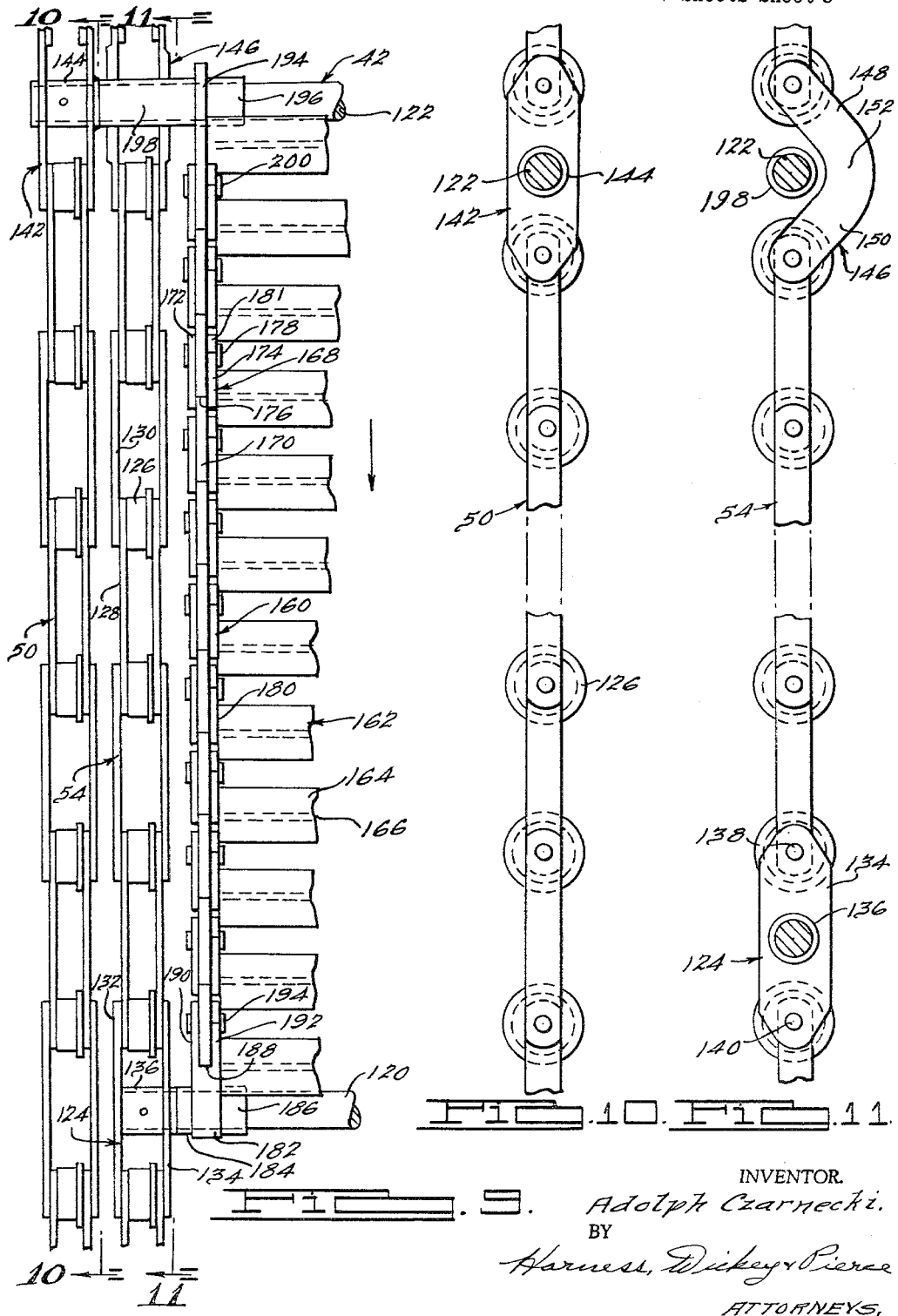
INVENTOR.
Adolph Czarnecki.
BY
Harness, Dickey & Pierce
ATTORNEYS.

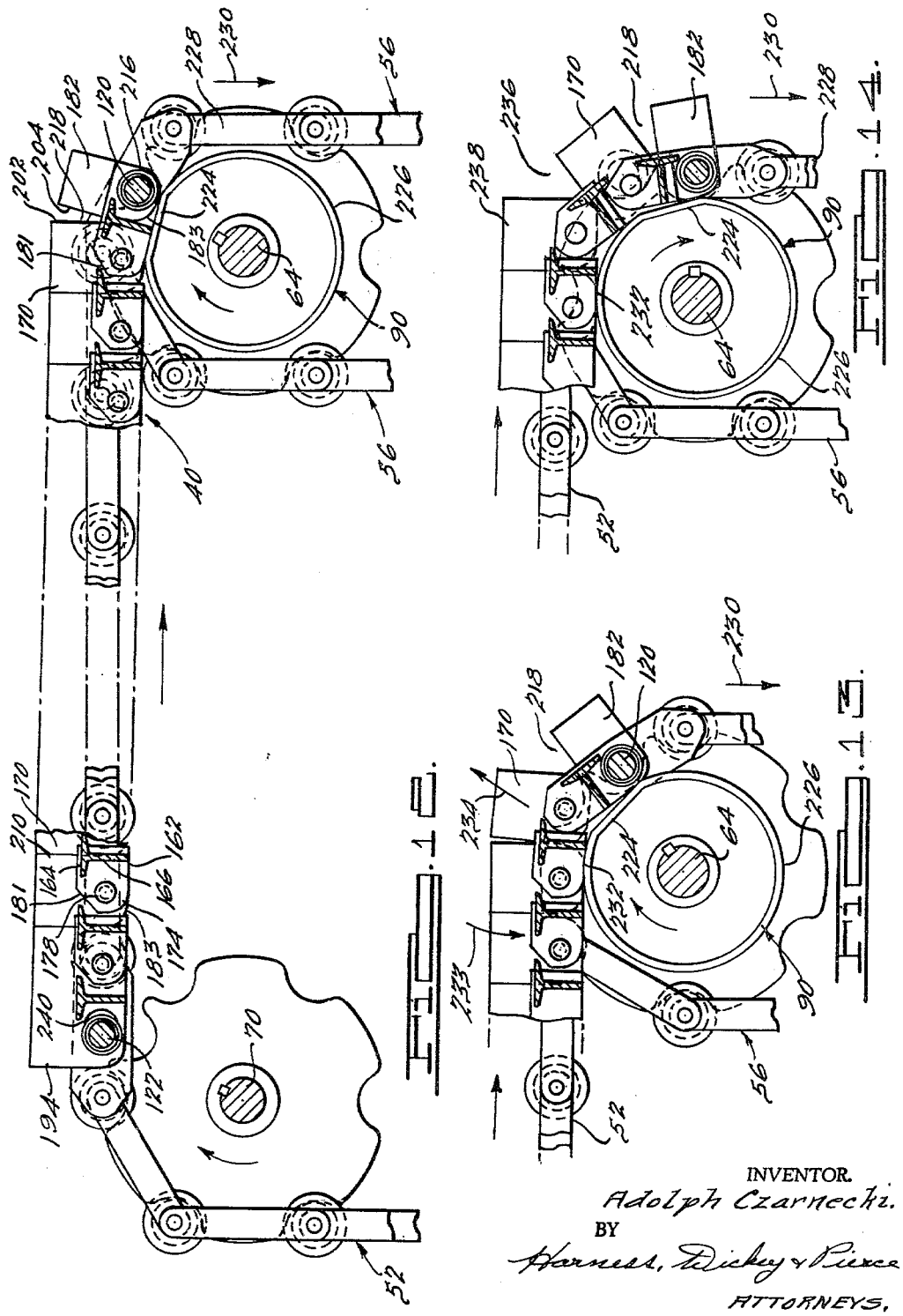

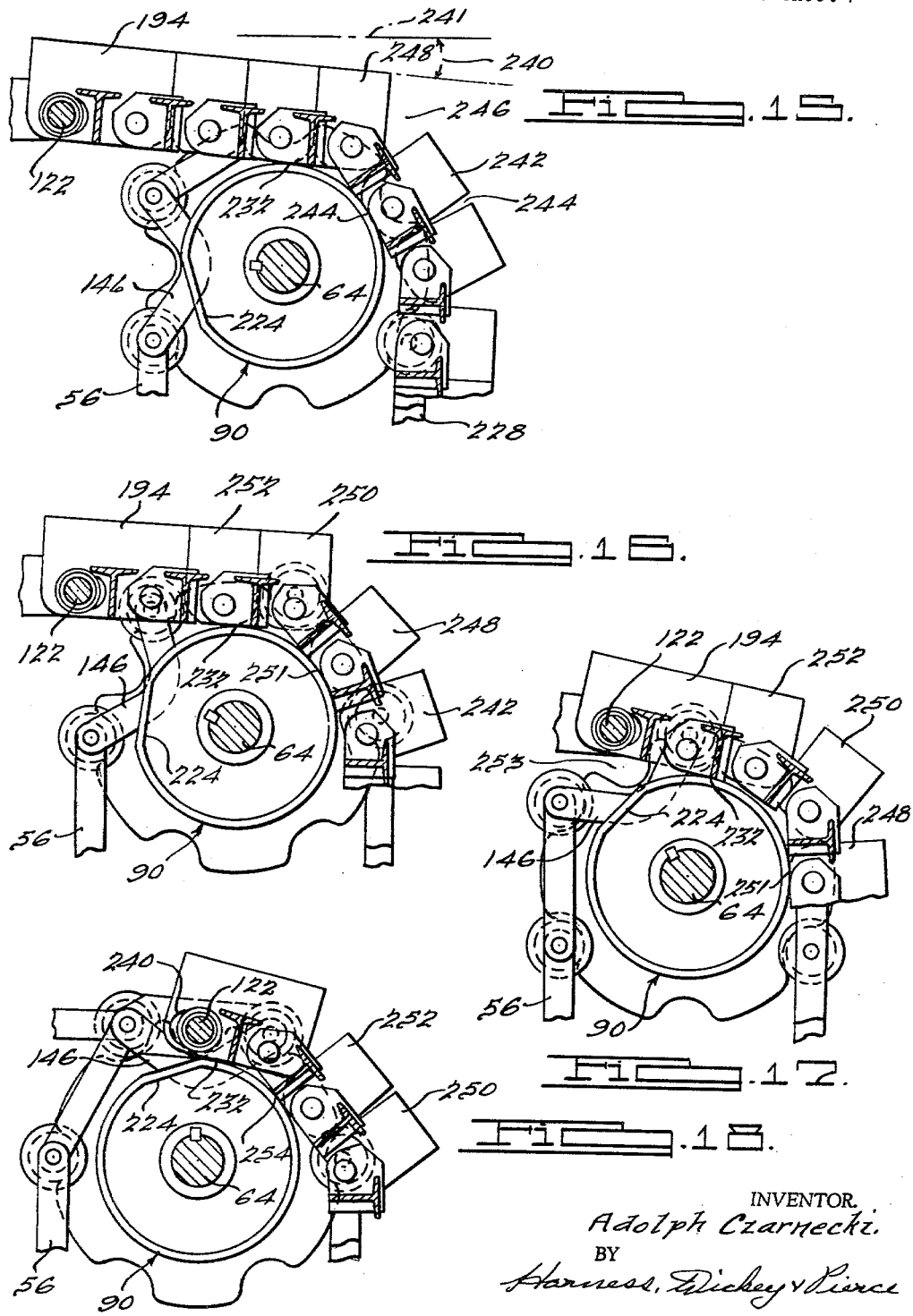

United States Patent Office 3,184,039
Patented May 18, 1965

3,184,039
HEAVY DUTY VERTICAL LIFT CONVEYOR
Adolph Czarnecki, Birmingham, Mich., assignor to Anchor Steel and Conveyor Company, Dearborn, Mich., a corporation of Michigan
Filed Aug. 13, 1962, Ser. No. 216,666
13 Claims. (Cl. 198—154)

This invention relates to improvements in heavy duty vertical lift conveyors and more particularly to improvements in conveyor platforms and drive chains associated therewith.

In use of a vertical lift conveyors of the general type to which this invention relates, problems have been encountered in obtaining a load-support platform which is capable of handling heavy loads. A difficulty lies in the fact that the platform must be capable of movement around sprocket wheels along with drive and support chains in relatively confined spaces. Consequently, the required flexibility of the platform has often been inconsistent with necessary rigidity to permit the handling of heavy loads.

Another difficulty encountered in vertical lift conveyors is the problem of attaining a smooth transfer of articles carried by the conveyor onto unloading apparatus. Vertical lift conveyors of the type to which this invention relates are generally arranged so that load carrying platforms associated therewith change from a horizontal load-carrying position to a vertical position as the loads carried thereon are removed therefrom or loaded thereon. The change in direction, or position, of the platforms from horizontal to vertical is accomplished by winding the drive chains and the platforms over sprocket and hub means immediately adjacent a loading or unloading chute or conveyor means. As the platform is wound over the sprocket and hub means and its position is changed between horizontal and vertical, the front and rear ends of the platform are simultaneously moving in different directions at right angles to one another or even in opposite directions. That is, the rear of the platform is generally moving in a horizontal or vertical direction while the front of the platform is conversely moving in a vertical or horizontal direction. Consequently, a buckling or wrinkling effect takes place in the platform surface and the platform surface tends to acquire an inclination relative to a horizontal or vertical plane such that the horizontal load surface is not level.

One of the most difficult problems in attaining satisfactory platform performance on the sprocket and hub means adjacent loading or unloading means is to obtain uniform smooth movement around the sprocket and hub means of the leading edge of the platform. The leading edge tends to remain in its approach plane and the initial transverse force exerted by the drive chain as it changes direction over the sprocket tends to cause maximum buckling in the platform surface. Accordingly, smooth loading or unloading and delivery of articles carried on the platforms is interrupted and the platforms themselves may become jammed or damaged.

One of the primary objects of the present invention is to provide a new and improved platform for a vertical lift conveyor system.

Another object of the present invention is to provide new and improved control means to guide movement of a platform of a vertical lift conveyor in a smooth continuous transition during changes of direction.

A further object of the present invention is to provide a support platform having new and improved means permitting resilient pivotal flexing of the platform around sprocket wheels in response to forces exerted upwardly against the load-bearing surface of the platform and yet permitting the platform to be rigidly locked in a horizontal position in response to loads directed downwardly against the load bearing surface.

Still another object of the present invention is to provide new and improved platform support means and associated linkages whereby the platform is supported as nearly level as possible in the load-carrying position without interference with the conventional drive chain means and whereby the drive and support chains may be more easily mounted in common planes without interference with the platform.

The inventive principles utilized to attain the aforementioned objects, and others, are hereinafter described in detail by reference to an illustrative embodiment of the invention as shown on the accompanying drawing wherein:

FIGURE 1 is a side elevational view of a vertical lift conveyor system embodying the principles of the invention;

FIGURE 2 is a schematic diagram of the apparatus shown in FIGURE 1;

FIGURE 3 is an end view taken along the line 3—3 in FIGURE 1;

FIGURE 4 is a plan view taken in the direction of the arrow 4 in FIGURE 1;

FIGURE 5 is a sectional view taken along the line 5—5 in FIGURE 1;

FIGURE 6 is a sectional view taken along the line 6—6 in FIGURE 1;

FIGURE 7 is a sectional view taken on the line 7—7 in FIGURE 1;

FIGURE 8 is a sectional view taken along the line 8—8 in FIGURE 1;

FIGURE 9 is a sectional view taken along the line 9—9 in FIGURE 1;

FIGURE 10 is a sectional view taken along the line 10—10 in FIGURE 9;

FIGURE 11 is a sectional view taken along the line 11—11 in FIGURE 9;

FIGURE 12 is a partial side elevational view showing the operation of a platform during a change in direction;

FIGURE 13 is a partial view of the apparatus shown in FIGURE 12 in an advanced operational position;

FIGURE 14 is a partial view of the apparatus shown in FIGURE 13 in an advanced operational position;

FIGURE 15 is a partial view of the apparatus shown in FIGURE 14 in an advanced operational position;

FIGURE 16 is a partial view of the apparatus shown in FIGURE 15 in an advanced operational position;

FIGURE 17 is a partial view of the apparatus shown in FIGURE 16 in an advanced operational position; and FIGURE 18 is a partial view of the apparatus shown in FIGURE 17 in an advanced operational position.

Referring now to FIGURES 1–8, a vertical lift conveyor system mounted on a framework 20 extending between spaced vertical positions 22, 24 is shown. A loading conveyor 26 having drive means 28 may be associated with the lower end of the vertical lift conveyor and an unloading conveyor means 30 having a drive means 32 may be associated with the upper end of the vertical lift conveyor. The vertical lift conveyor is adapted to receive articles from the loading conveyor 26 on platform means 34, 36, 38, 40, 42, 44, of identical construction. The platforms are substantially rectangular in plan view and are suspended at the four corners on continuous chain means comprising chains 50, 52 which form an outer pair of chains movable in parallel paths and chains 54, 56 which form an inwardly spaced pair of chains movable in parallel paths. All of the chains are of equal length. The chains 50, 52 are mounted on spaced sprocket wheels attached to sprocket wheel shafts 60, 62, 64, 66. The chains 54, 56 are mounted on spaced sprocket wheels attached to sprocket wheel shafts 60, 64, 66, 70. The shafts 60, 64 and 66 are provided with four sprocket wheels for the chains. Each of the shafts 62, 68, 70 support a pair of sprocket wheels since only one pair of chains are associated therewith. A chain drive motor 80 may be mounted on top of the frame 20. The motor is connected through belt means 81, 82, a sprocket and shaft assembly 83, and belt means 84, 86 to drive sprockets 87, 88 mounted on the shaft 64.

The operation of the conveyor system may be described in general terms by reference to FIGURE 2. Articles 100 are moved onto the platforms by the loading conveyor 26. The platform 34 is shown moving into horizontal loading position around the sprockets on shaft 60. The article 100 is then carried in a horizontal direction into a position between the sprockets on shafts 62, 68 whereat the outer chains 50, 52 are separated from the inner chains 54, 56 to support the platform 34 in a four-point suspension. As the inner and outer chains move vertically between the sprockets on shafts 62, 64 and 68, 70, respectively, the platforms are carried vertically as indicated by the platforms 36, 38. When the platforms reach the top of the conveyor the outer chains are first wound around the sprockets on shaft 70 and the inner chains and outer chains are wound around the sprockets on shaft 64 to change the position of the platform from horizontal to vertical. The platforms are simultaneously wound over drum means 90, 92 associated with the sprockets on shaft 64 as indicated by the platform 40. As the platform 40 moves around the sprockets on shaft 64, the articles 100 are deposited on the unloading conveyor 30. The platforms thereafter move downwardly as indicated by the platform 42, around the sprockets on shaft 66 as indicated by the platform 44, and back to the loading position.

Referring now to FIGURES 9, 10 and 11, each of the platforms is shown to comprise a front crossbar 120 which provides the leading edge of the platform during movement with the conveyor chains and a rear crossbar 122. Although only one side of the platform is shown, it is to be understood that the other side is identically formed. The front crossbar 120 is fixedly rotatably connected to a specially constructed link 124 of the inner chain 54. The rest of the chain is conventional in design and comprises a plurality of roller elements 126 connected by link means 128, 130. The specially constructed link 124 comprises spaced plates 132, 134 having a centrally located hub means bushing 136 adapted to receive the end of the crossbar 120. The ends of the plates 132, 134 are pivotally connected by pin elements 138, 140 to adjoining links of the chain.

The rear crossbar 122 is connected to the outer chain 50 by the provision of a similar specially designed link 142 which is identical to the link 124 and has a central bushing 144 adapted to receive the end of the rear crossbar 122. The inner and outer chains are parallelly aligned so that corresponding portions of the chains lie in the same plane. When the sections of the chains between the front bar 120 and the rearbar 122 are straight, the central axes of the bars are parallelly aligned and lie in a common plane with one another and the axes of the chain rollers and pivotal connections. The connection of the rear crossbar 122 to the outer chain 50 is accommodated by the provision of a special link 146 in the inner chain 54. As shown in FIGURE 11, the special link 146 is shown to have a bow-shaped configuration formed by inclined leg portions 148, 150 which are connected by a curved central portion 152. The leg portions 148, 150 extend outwardly from the common plane of the chains and the platform to permit the crossbar 42 to extend straight across to the outer chain 50 through the plane of inner chain 54. In this manner the front and rear of the platform are connected to the chains at points in the same plane whereby level horizontal support surface is maintained for the articles to be conveyed.

The platform is formed by rail means 160 extending between the front and rear crossbars and by slat means 162 supported thereby. A plurality of spaced slat means 162 extend transversely between the rail means parallel to the front and rear cross-bars 120, 122. The slats 162 are T-shaped in cross section and have a substantially flat load bearing upper surface 164 and a transversely extending support flange 166 as shown in FIGURE 12.

The rail means 160 are formed by a plurality of specially constructed links 168 having a substantially Y-shape in plan view as seen in FIGURE 9. Each link comprises, in plan elevation, a central plate portion 170 on which a bifurcated end portion is formed by spaced parallel plates 172, 174 which are secured on opposite sides of the central plate portion by some suitable means such as by welding. The plates 172, 174 define a central slot 176 within which the adjacent central portion of the adjacent link is adapted to be received. The links are pivotally connected to one another by pivot means 178. Each link includes two pivot means 178 which provide two pivotal axes. For maximum rigidity and strength, the slats 162 are welded or otherwise suitably secured to the inner side surface 180 of each of the links 168 in a centrally located position between adjacent pivots 178 and substantially aligned with the intersection of the slot 176 and central portion 170. Each inner plate 174 is provided with a clearance shoulder 181 to provide clearance for the adjacent slat during bending. The lower corner 183 of the central plate portion is rounded for clearance purposes as shown in FIGURE 12.

The link rail is connected to the front crossbar 120 by means of a modified link 182 having bushing portions 184, 186 which receive the front crossbar 120. The rear end of the link 182 is similar to links 168 and is bifurcated to provide a slot 188 defined by spaced leg portions 190, 192. Pin means 194 pivotally connect the rail links thereto. The rear crossbar 122 is connected to the link rail by a modified link 194 having bushing portions 196, 198 which receive the rear crossbar 122. The front end of the link 194 is received in the bifurcated portion of the adjacent link of the link rail and is pivotally connected thereto by pin means 200.

Referring now to FIGURE 12, it may be seen that the side surfaces 202, 204 of the central plate portions 176 of each of the links of the chain rail are positioned closely adjacent one another in abutting engagement, as indicated at 210, when the platform is in a straight line position on the chains. Suitable clearance is provided between adjacent links to permit one way pivotal movement to and from the abutting position. It may thus be seen that as long as the chains move in a straight line and lie in the same plane none of the rail links are pivotally movable about the pivots 178 and the abutting engagement between adjacent surfaces 202, 204 of the central plate portions 176, as indicated at 210, prevents any pivotal movement and rigidifies the platform. However, when the leading edges of the links are displaced out of the plane of the platform as indicated at 216, the entire link is free to pivot away from the adjoining link as indicated by the gap 218. The leading edge represented by the front crossbar 120 is moved out of the plane of the platform when the chains start around the sprocket assemblies. In order to control movement of the platforms around the sprocket assemblies, a platform control means in the form of the drum elements 90, 92 are associated with each sprocket assembly. The drum elements are keyed to the sprocket shafts in spaced relationship for engagement with the link rails of the platform. A special control surface in the form of a flat 224 is formed on the periphery of the drums for a purpose to be hereinafter described. The periphery 226 of each drum is otherwise substantially cylindrical and has a circumferential length such that a platform completely passes around the sprocket shaft during one revolution. The control surface 224 is located and timed to centrally engage the first rail link of each platform.

The initial movement of the platforms as they change direction around a sprocket assembly is shown in FIGURE 12 whereat the lead link 182 has been slightly pivoted downwardly in response to movement of the adjacent portion 228 of the chain 56 around the sprocket assembly in the direction of the arrow 230. The movement of flat 224 is timed to receive the lower edge of the link 182 in substantially full abutting engagement and guide and control displacement of the leading edge of the platform represented by the front crossbar 120 and the platform around the sprocket assembly. It may be seen that the clearances 181, 183 on the rear of the inner sides of the links are provided to permit the links to pivot without interference. If the control drum was not provided, the platform would tend to remain in a straight line position but gradually tilted at an angle relative to the original direction of movement determined by the amount of movement of the leading edge away from the original plane of the platform as the leading edge moves around the sprocket assembly.

Referring now to FIGURE 13, the gap 218 between the center plate portion 182 and the next adjacent center plate portion 176 gradually widens and the upper surface of the platform is slightly inclined relative to a horizontal plane. As the platform is inclined and pulled toward the sprocket assembly, contact is made at 232 between the bottom of the next rail link and the drum surface in a centrally located position between the slot and the rear pivotal connection. In this manner, the loads exerted on the subsequent links are always supported by the abutment of adjacent links or the drum surface so that none of the links can "back bend" by pivotal movement in the direction of arrow 233 as the drum is approached. The rail links are subsequently pivoted outwardly in the general direction of the arrow 234 to cause a smooth uniform break in the platform surface by pivotal movement between the links. The pivotal movement of the platform around the drum results in an effective elongation of the total length of the platform measured along the outer surface between the front and rear crossbars. The elongation results from the pivotal action of links even though the length of the platform as measured from center to center of the connecting pivots does not vary. In order to accommodate the increase in length and to obtain uniform smooth flow of the platform around the sprocket assembly, expansion means in the form of an elongated slot 240 is provided in the rear links 194. The rear crossbar 122 is mounted in the slots 240 and permits movement of the platform relative thereto as shown by a comparison of FIGURES 12 and 18.

The portion of the unbroken platform behind the sprocket assembly gradually acquires an increased angle of inclination relative to straight line position as the change in direction of the platform progresses. The amount of pivotal movement of the links varies depending on the location and time of engagement with the control drum as may be seen by comparing the width of the gaps between links as the platform moves around the drum. The movement of link 182 around the sprocket assembly may be followed by reference to FIGURES 12–14.

Referring now to FIGURE 14, it may be seen that the gap 218 becomes smaller as the lead link 182 approaches the new straight line position beyond the sprocket assembly and the succeeding links 176 become fully supported on the drum 220. A gap 236 substantially wider than gap 218 at a comparable position, before the succeeding link has started to pivot, is obtained between the link 176 and the next succeeding link 238 as shown in FIGURE 14. The succeeding links follow over the sprocket assembly in the same general manner although with different spacing and pivotal action.

Referring to FIGURE 15, the angle of inclination 240 of the platform surface becomes more inclined relative to the original straight line position 241 as the rear of the platform approaches the sprocket assembly. The link 242 is supported on the drum as indicated at 244 and is separated from the preceding and succeeding links by gaps 244, 246. The link 247 is also supported on the drum at 232 and rigidly supports the platform load without "back bend" as previously described. The flat 224 on the drum has moved around to the position indicated at 224 and the special link 152 of the inner chain 56 approaches top dead center relative to the sprocket assembly. In FIGURE 16, the platform is shown in a subsequent position whereat the link 248 is supported at 251 and the platform load by link 250 at 232 on the periphery of the drum. In FIGURE 17, link 250 is shown suspended between link 252 and link 248 which are supported on the periphery of the drum at 232, 251. The special link 146 approaches the rear support bar 122 as indicated by the closing of the gap 253. In the final position of the movement of the platform around the sprocket assembly shown in FIGURE 18, the special link 146 has received the rear support bar 122. The last of the rail links 252 is supported at 254 and the special link at 232 on the periphery of the drum.

The aforedescribed platform construction and link arrangement provides a platform for a vertical conveyor system which remains completely rigid when being elevated and is still capable of articulation or flexing around the drive sprockets to change directions. The term "no back bend platform" can be used to described the platform operation. It should be pointed out that the length of the slots forming the expansion means must be limited because it is desirable to maintain the platform in a substantially vertical position during elevation. If the slots were of any substantial length, the platform would have a tilt as it was vertically elevated. The control means on the drum compensate for any additional buckling or wrinkling effect which might be imparted to the platform surface. Consequently, the drum control means and expansion means provide particularly advantageous results in combination even though it may be possible to use either one separately in some applications. It is also important to note that this system can be made operative in either direction with the platform held in uniform parallel alignment between the chains and in flat horizontal load carrying positions during vertical movement without tilt. The flat platform is capable of being elevated as described to carry extremely heavy loads from the lower position to the higher position or may be operated reversely to carry loads from the higher position to the lower position.

Since the invention hereinbefore described is capable of utilization in other environments and embodiments, it is intended that the appended claims be construed to include the inventive principles wherever applied.

The invention claimed is:

1. A conveyor system having a path of movement defined by continuous spaced chain means, platform means connected to said chain means for movement therewith in a load-supporting and carrying position along a portion of the path of movement of said spaced chain means, sprocket means associated with said chain means to drive and guide said platform means along said path of movement, support means associated with said sprocket means to engage portions of said platform means and guide said platform means as said chain means pass over said sprocket means and control means operative between said support means and said chain means to prevent buckling or distortion of said platform means during movement around said support means.

2. The invention as defined in claim 1 and wherein said support means comprises drum means having a substantially cylindrical platform contacting surface and said control means comprises a radially inwardly located flat surface portion adapted to engage the leading edge of said platform means and initiate guided movement of said platform means over said drum means as said chain means passes over said sprocket means.

3. The invention as defined in claim 2 and wherein said control means further comprises expansion means to permit said platform means to shift longitudinally relative to said chain means during movement over said sprocket means.

4. A conveyor system comprising a plurality of continuous chains providing a coontinuous path of movement, portions of some of said chains being located in alignment in a common plane along portions of said path of movement and being spaced in inner and outer aligned pairs of chains, sprocket wheel means provided for each of said pairs of chains, platform means mounted between and in the plane defined by said pairs of chains and being supported at one end by the inner pair and at the other end by the outer pair, and bowed links provided on said inner pair of chains to permit said platform means to extend to said outer pair of chains in said plane through the central axis of said inner pair of chains whereby said platform means is connected to said chains in a common plane.

5. A platform for a conveyor system comprising a plurality of continuous chain means, spaced connecting means for connecting said platform to said chain means for movement therewith and support thereby, spaced link rails extending between said connecting means parallel to said chain means, pivotally connected link means forming said link rails, rigid support bar means connected to each link means and extending transversely between said link rails to form a load-supporting surface, and means to permit bidirectional movement of said platform by pivotal displacement of adjoining link means and elongation of said load supporting surface.

6. The invention as defined in claim 5 and wherein said last mentioned means comprises slot means associated with said spaced connecting means to permit relative movement between said platform and said chain means.

7. The invention as defined in claim 5 and wherein said link means comprise a central plate portion, spaced leg portions connected to said central plate portion and defining a slot having a width substantially equal to the width of said central plate portion and extending in substantial alignment therewith, pivotal connection means formed in said central plate portion and said leg portions, and said link rails being formed by pivotal association of said link means with the central plate portion of one of said link means receivable in the slot of an adjacent link means and with the central plate portions in abutting engagement on one side of said pivotal connection means in a straight line condition of said link rails to permit only one way pivotal movement from the positions of abutting engagement.

8. The invention as defined in claim 7 and wherein said rigid support bar means are fixedly connected to each of said link means at one of said leg portions in a position centrally located and aligned with the intersection of said central plate portion and said slot.

9. A platform for conveying articles on continuous chain means, a plurality of crossbar means forming a load support surface, link means pivotally supporting said crossbar means for one way pivotal movement in response to upwardly directed forces on said load bearing surface, and each link means having two pivotal axes and a pair of abutment surfaces rigidly interlocking said crossbar means in a substantially flat condition in response to downwardly directed forces on said load bearing surface, one of said abutment surfaces being located between said pivotal axes and the other of said abutment surfaces being located outwardly beyond said pivotal axes.

10. The invention as defined in claim 9 and wherein said crossbar means are fixedly connected to said link means intermediate said pivotal axes.

11. The invention as defined in claim 10 and wherein the ends of said link means opposite said other abutment surface are provided with clearance means to permit pivotal movement between adjacent link means without interference between said link means and said crossbar means.

12. In a conveyor system, a platform, a plurality of continuous chains movable along a predetermined path, said chains being formed from link elements, connecting means to connect said platform to said chains whereby said chains and said platform are substantially in a common plane along portions of said paths, said connecting means comprising certain ones of the links forming said chains, said ones of said links being pivotally connected at each end in and forming part of said chains, hub means carried by said links, and shaft means connected to said platform at one end and to said ones of said links in said hub means at the other end.

13. The invention as defined in claim 12 and wherein one end of said platform is connected to a first chain located adjacent thereto, the other end of said platform being connected to a second chain located outwardly beyond said first chain, and bowed link means provided in said first chain in alignment with the other end of said platform to permit connection of said platform to said second chain by shaft means and hub means lying in the same plane as said first chain means.

References Cited by the Examiner
UNITED STATES PATENTS 2,905,264   9/59   Dennis _____ 74—250
3,024,891   3/62   Iawrie _____ 198—153

SAMUEL F. COLEMAN, *Primary Examiner.*

WILLIAM B. LA BORDE, ERNEST A. FALLER, JR.,
*Examiners.*